United States Patent
Stiller et al.

(10) Patent No.: US 6,704,283 B1
(45) Date of Patent: Mar. 9, 2004

(54) TRAFFIC ROUTING IN SMALL WIRELESS DATA NETWORKS

(75) Inventors: Thomas Michael Stiller, Ewing, NJ (US); William Edward Stephens, Belle Mead, NJ (US); Nisha Pauline Newman, North Brunswick, NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 09/506,096

(22) Filed: Feb. 17, 2000

Related U.S. Application Data (63) Continuation of application No. 09/063,198, filed on Apr. 20, 1998, now Pat. No. 6,130,881.

(51) Int. Cl.$^7$ .............................. H04J 3/24; G06F 13/00

(52) U.S. Cl. ...................... 370/238; 370/254; 370/392; 370/400; 455/445; 709/242; 709/243

(58) Field of Search ................................ 370/230, 231, 370/235, 236, 238, 254, 255, 389, 392, 400, 401, 410; 455/445; 709/238–243, 245; 714/1–4

(56) References Cited

U.S. PATENT DOCUMENTS

| | | | |
|---|---|---|---|
| 5,142,531 A | | 8/1992 | Kirby ......................... 370/94.3 |
| 5,467,345 A | * | 11/1995 | Cutler, Jr. et al. ............. 370/60 |
| 5,491,690 A | * | 2/1996 | Alfonsi et al. ................. 370/60 |
| 5,506,838 A | * | 4/1996 | Flanagan ..................... 370/54 |
| 5,802,054 A | * | 9/1998 | Bellenger ................... 370/401 |
| 5,949,786 A | * | 9/1999 | Bellenger ................... 370/401 |
| 5,987,011 A | * | 11/1999 | Toh ............................ 370/331 |
| 6,064,887 A | * | 5/2000 | Kallioniemi et al. ........ 455/445 |

OTHER PUBLICATIONS

Perkins C.E., et al: "Highly Dynamic Destination–Sequenced Distance–Vector Routing (DSDV) For Mobile Computers" Computer Communications Review, Association For Computing Machinery, New York, US, vol. 24, No. 4, Oct. 1, 1994, pp. 234–244.

* cited by examiner

Primary Examiner—Alpus H. Hsu
(74) Attorney, Agent, or Firm—William J. Burke (57) ABSTRACT

A method of transmitting a message from a source node to a destination node in a small, wireless network having up to N nodes in which each message has appended thereto concise network configuration data which eliminates the need for routing protocols without adding significant overhead to the network communications. The method includes the steps of creating for each node a route table containing a count of the number of transmission hops necessary to reach each destination node and a node number of a neighboring node forming a next link in a chain of hops to each destination node, where the node number identifies a unique bit in an N bit address mask. Routing data is appended to the message data which includes an N bit destination word identifying the destination node or nodes, an N bit route word including a logical OR of the address mask of the relay node or nodes, and a route update message identifying what the current node knows about the network configuration. The number of N bit words in the route update message indicates a maximum number of transmission hops away from the current node that the current node could know about the network configuration. Upon receipt of such message data and its routing data, all receiving nodes update their route tables from the route update message. Then, if the receiving node is a destination node, the message data is processed. Also, if the receiving node is a relay node, then the receiving node replaces the route word and route update message with data from its updated route table and retransmits the message data with the destination word, the replaced route word and the replaced route update message as its routing data.

42 Claims, 3 Drawing Sheets

| DESTINATION | HOP COUNT | RELAY | AGE | NOTES |
|---|---|---|---|---|
| 00000001 | 1 | 00000001 | 1 | |
| 00000010 | 0 | 11111111 | 3 | MORE THAN 3 HOPS |
| 00000100 | 0 | | | NO ROUTE TO SELF |
| 00001000 | 1 | 00001000 | 2 | |
| 00010000 | 3 | 00001000 | 4 | OR 00000001 |
| 00100000 | 1 | 00100000 | 2 | |
| 01000000 | 2 | 00000001 | 1 | OR 00001000 |
| 10000000 | 3 | 00001000 | 0 | OR 00000001 |

ROUTE TABLE FOR NODE F

TRAFFIC ROUTING IN SMALL WIRELESS DATA NETWORKS

This application is a continuation of Ser. No. 09/063,198 filed on Apr. 20, 1998 now U.S. Pat. No. 6,130,881.

This invention was developed under U.S. Government Contract No. DAAB07-97-C-D607. The U.S. Government may have certain rights in this invention

BACKGROUND OF THE INVENTION

1. Field of the Invention

The present invention relates to a technique for the assignment and use of node addresses in a small, wireless data communications network or a small, wireless sub-network of a larger network and, more particularly, to a technique which permits network configuration data to be sent with every message without the need for complex routing protocols and without adding significant overhead to the network communications.

2. Description of the Prior Art

Conventional wireless networks typically permit nodes to communicate only if they are within range of each other (i.e., in the same "cell"). Sophisticated software protocols are typically required to control message traffic to permit communication from one cell to another. Such protocols typically add substantial overhead to the network communications. Also, to provide sufficient communications range, such systems typically require each node to have relatively powerful transmitters to communicate with all nodes in that cell. However, even when relatively powerful transmitters are used, communications may be interrupted when the source node or a destination node leaves the cell. Moreover, such systems are limited by the distance and direction to the destination node from the source node, and, as a result, complicated routing information must be transmitted periodically to all nodes in the network.

There has been a lot of work in the field of routing protocols in wireless networks. Conventional systems address the problem of routing protocols in small to large networks in which the nodes are not known beforehand by identifying the nodes identified only by their "IP addresses". The associated routing protocols attempt to obtain a route from source to destination for packet communication. Such wireless networks can be classified under two broad categories: cellular network and ad hoc network.

In a cellular network there are few special nodes (commonly referred to as base stations) spread over an area. These "special nodes" can communicate amongst themselves via wired network, satellite, higher transmit power, etc. The users which normally have lower transmit power communicate with one of these special nodes. If there is a need to communicate with other wireless nodes, then message data is exchanged via other special nodes. However, there are several protocols to keep track of, such as, where the nodes are and what happens when moving nodes move from one cell to another.

In an ad hoc network on the other hand, there are no known special nodes. The network among the nodes has to first establish itself. Nodes exchange "Hello" messages to find neighbors and other information about neighbors. Some protocols require frequent exchanges of their own positions, links, etc. and, based on that information, all nodes attempt to keep optimized updated routes to all nodes in the network. Other sets of protocols do not keep updated route information, but when a source node needs to communicate with a specific destination, the destination node will be searched for.

It is desired to provide a communications system with simple software protocols for controlling message traffic which are concise enough to be appended to each message without adding significant over head to the communications system. Such protocols should also allow ad hoc communications among the nodes in an ad hoc wireless network without regard to the proximity of the other members of the network, particularly the destination node. The present invention has been designed to meet these needs in the art.

SUMMARY OF THE INVENTION

The present invention addresses the above-mentioned needs in the art by providing a technique for the assignment and use of addresses in a small, wireless data communications network or a small, wireless sub-network of a larger network where the endpoints of the network are widely dispersed relative to the range of their transmitters, which may be either radio, infrared, or other wireless media. The endpoints may be in motion and the path between any two endpoints may change over time.

In particular, the present invention relates to a method of transmitting a message from a source node to a destination node in a small, wireless network having up to N nodes in which each message has appended thereto concise network configuration data which eliminates the need for complex routing protocols without adding significant overhead to the network communications. The method guides the data packets to the destination without requiring the source and/or relay nodes to know the precise route to the destination. Rather, the source and/or relay nodes guide data packets to the destination via an appropriate neighboring node. Such a method in accordance with the invention includes the steps of creating for each node a route table containing a count of the number of transmission hops necessary to reach each other node in the network and a node number of a neighboring node forming a next link in a chain of hops to each other node, where the node number identifies a unique bit in an N bit address mask. Routing data is appended to the message data which includes an N bit destination word identifying the destination node or nodes, an N bit route word including a logical OR of the address mask of the relay node or nodes, and a route update message identifying what the current node knows about the network configuration. The number of N bit words in the route update message determines a maximum number of transmission hops away from the current node that the current node could know about the network configuration. Upon receipt of such message data and its routing data, all receiving nodes update their route tables from the route update message. Then, if the receiving node is a destination node, the message data is processed. Also, if the receiving node is a relay node, then the receiving node replaces the route word and route update message with data from its updated route table and retransmits the message data with the destination word, the replaced route word and the replaced route update message as its routing data.

In a preferred embodiment of the invention, the route from the source node to the destination node or nodes is determined by selecting a route with a minimum number of transmission hops. The address mask of the first node in the route is then selected as the route word. The destination word, on the other hand, is created by taking a logical "OR" of the address masks of each destination node, while the transmission node is typically determined using time, frequency, or code division techniques.

Upon receipt of a route update message, the route table of each node is updated by setting a relay word in the row of the route table in which the transmitting node is the destination node to the address mask of the transmitting node and setting a transmission hop count in the row of the route table in which the transmitting node is the destination node to 1 to indicate that the current node is directly connected to the transmitting node. Then, for route update messages having two or more N bit words, each N bit word in the route update message is stacked vertically from first to last. A column of bits corresponding to the unique bit in the N bit address of the destination node is then selected, and the number of transmission hops to the destination node is determined as the binary number in the column defined by reading the bits in the column downward from the stacked first to last N bit words in the route update message. The route table is then updated by performing the following steps for each column in the stacked N bit words of the route update message:

setting the destination node to correspond to the node identified by the column position in the stacked N bit words of the route update message;

selecting a row of the route table corresponding to the destination node;

if all bits in the column are "0" or all bits in the column are "1", then if the selected row's relay node corresponds to the relay word, setting the transmission hop count to zero and setting the relay mask to an initial state; and     if all bits in the column are not "0" or "1", adding one to the binary number in the column to get a new transmission hop count, then if the new transmission hop count is less than the transmission hop count in the row of the route table corresponding to the destination node, replacing the transmission hop count with the new transmission hop count and setting the relay mask to the relay word.

The invention also relates to a wireless network having up to N nodes, where each node in the network comprises a wireless transmitter, a wireless receiver, and a processor which is programmed by software so as to transmit and receive message data with a destination word, a route word, and a route update message for processing in accordance with the method of the invention. Such a network may be made by loading an application program for implementing the communications technique of the invention onto each node in a small wireless network and setting a few initial conditions of the network. The respective nodes would be informed of changes in the network configuration as nodes move and are added or deleted from the network by appropriately updating the route tables using the techniques of the invention.

BRIEF DESCRIPTION OF THE DRAWINGS

The present invention will be better understood after reading the following detailed description of the presently preferred embodiments thereof with reference to the appended drawings, in which.

DETAILED DESCRIPTION OF THE PREFERRED EMBODIMENT

A system and method which meets the above-mentioned objects and provides other beneficial features in accordance with the presently preferred exemplary embodiment of the invention will be described below with reference to FIGS. 1–4. Those skilled in the art will readily appreciate that the description given herein with respect to those figures is for explanatory purposes only and is not intended in any way to limit the scope of the invention. Accordingly, all questions regarding the scope of the invention should be resolved by referring to the appended claims.

Small Network Communications Model

The message addressing technique of the present invention provides a means whereby computing systems equipped with radio, infrared, or other wireless media communications devices may be organized into a small, wireless data communications network or a collection of small, wireless sub-networks of a larger network of computing systems. Preferably, the message addressing technique of the invention is used in a network which has a small number of nodes as determined by the bandwidth of the transmission medium and the underlying media access control layer. The communications model for the present invention is generally a network having 2–8, 2–16 or 2–32 nodes. Such a small network model assumes that the nodes may be mobile, that the nodes are widely dispersed relative to the range of their transmitters whereby a connection from one node to another may require one or more relays, and that the path between any two nodes may change over time.

Since the transmission range of each node in the network of the invention is limited, each node in the network is assigned a set of dedicated transmit opportunities called "user-zones." In the network, each user-zone is defined by a set of parameters including all or some combination of the following parameters: starting time of transmission(s), ending time of transmission(s), frequency band(s), and pseudo-random code(s) modulation. A node has uncontested access only in its own user-zone and "listens" to the user-zones of other nodes. The user-zones are established by system configuration and typically are not subject to change after deployment. Additional transmit opportunities may be defined for other purposes; however, the dedicated user-zones are preferred for the technique of the invention. Various types of TDMA, FDMA, and CDMA techniques may be used for the message transmissions.

Secondary schools where students move from classroom to classroom carrying network-capable palmtop computers constitute an ideal environment for the network addressing technique of the invention. Other candidate environments exist throughout the business and manufacturing sectors. Examples include roving inspectors, sales force, ski patrols, oil field employees, and the like.

The procedures described herein provide a mechanism by which conventional network applications operating on the supporting computing systems may interoperate without regard to the proximity of the other members of the network. A very small network of eight nodes will be described below by way of example, although those skilled in the art will appreciate that the same techniques may be used for larger networks having up to 32 or even 64 nodes.

Figure 1:
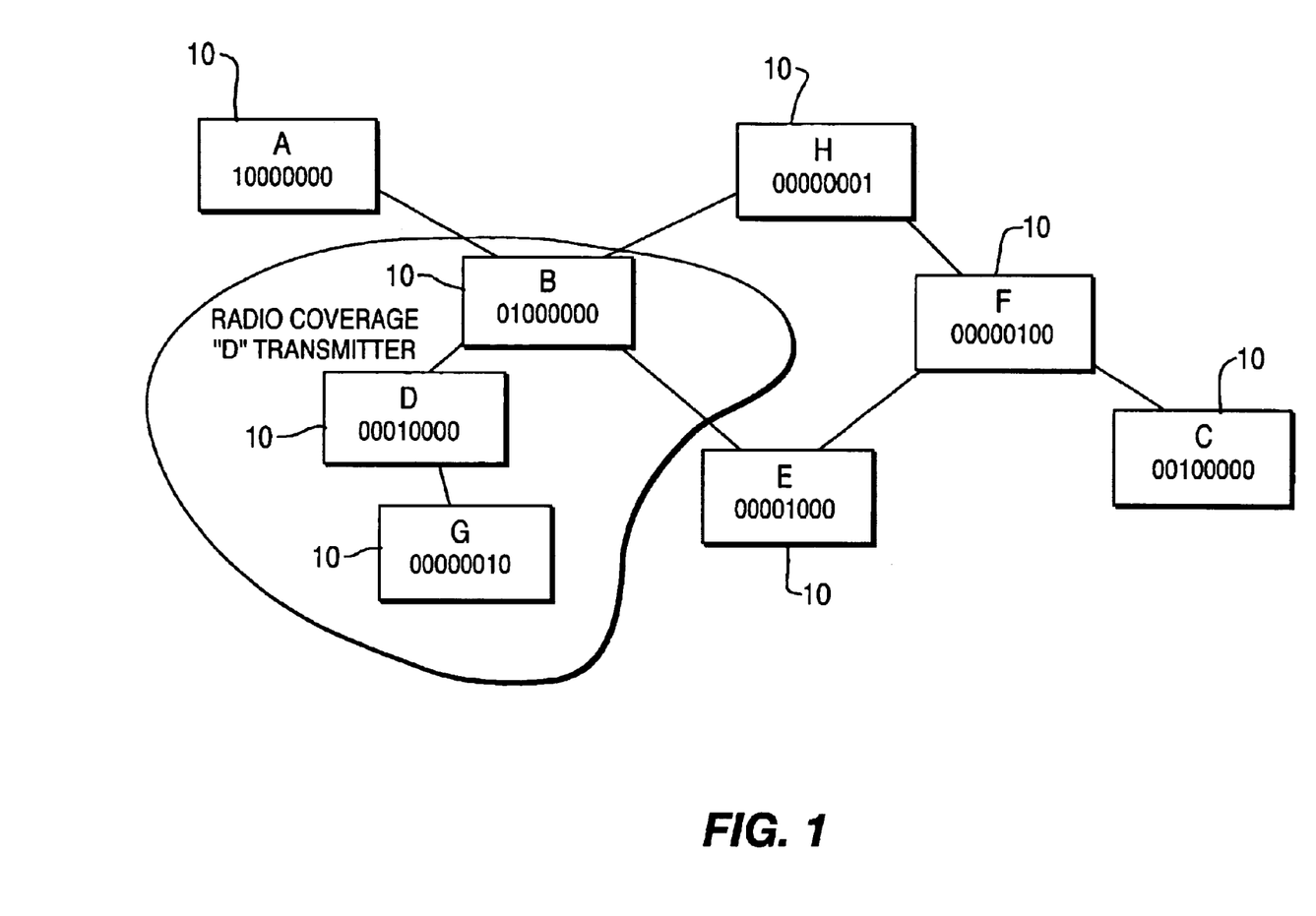
FIG. 1 is a block diagram of radio equipped computing systems (nodes) spatially deployed in a small, ad hoc wireless network in accordance with the invention.

FIG. 1 illustrates a network of radio equipped computing systems (nodes) which are spatially deployed as illustrated. Because of terrain and other environmental factors, the coverage area for a given node's transmitter may be irregular, as shown by the shaded area for node "D." The effective, instantaneous, connectivity of the network is indicated by solid lines connecting node pairs. However, it is expected that the nodes might be in motion and that this connectivity will change with time.

The procedures described herein operate on instantaneous views of the configuration which are locally corrected by the exchange of short update messages. As will be explained in more detail below, one of the novel features of the technique of the invention is that the small size of the update messages permits them to be attached to ordinary network traffic rather than employing a separate, dedicated routing protocol.

Address Technique

By numbering the afore-mentioned user-zones, the assigned number can be used as a pseudonym or address for the node(s) which is permitted to transmit in that user-zone. In a small network (e.g. 32 nodes), this produces a very concise addressing scheme where a node can be identified by the position of a "1" bit in a 32-bit word. In other words, a "node mask" can be formed from a 32-bit word containing a single "1" bit in the assigned position. A group of nodes can be collectively identified by forming the logical OR of their respective node masks. For example, in the network of FIG. 1, each node is assigned a number in the range from 0 to 7 derived from the conventional Internet (I/P) address. Software executing on each node forms a bit address from the node number by shifting a "1" bit left the number of places indicated by its assigned number. In the example of FIG. 1, this process forms a unique 8-bit mask word for each node, where the mask for each node contains exactly one bit set to "1" in a unique bit position with respect to other nodes. The assignments for the example network are shown as binary numbers below the node designator in FIG. 1.

In accordance with the technique of the invention, each message transmitted by a node will contain routing data containing, as a minimum, a destination word, a route word, and one or more words of route update information. In addition, the transmitter will be identified by either a transmission characteristic (such as a time or frequency slot) or by inserting the transmitter's assigned number in the message routing data. The routing data may, for example, be attached as a message prefix or suffix.

Routing Scheme based on Address Technique

1. Connectivity Mask

During normal operation of the network in accordance with the invention, each node enables its receiver for the entire set of user-zones. If a valid message, regardless of content, is detected in any user-zone, then the node associated with that user-zone is within range of the transmitting node and constitutes a "neighbor." The set of nearest neighbors is formed by placing a "1" bit in the appropriate position in the receiving node's "connectivity mask". For example, in FIG. 1, the connectivity mask of node B would be "10011001". As will be explained in more detail below, the connectivity mask may be extended to several words to provide a concise route update message indicating the number of message retransmission or "hops" necessary to reach each other node in the network which is known to the transmitting node. To accommodate the effect of node mobility on the neighborhood, the connectivity mask for each node is reconstructed at intervals commensurate with the expected migration rates of the nodes.

2. Route Table

Each node has a route table which contains one entry for each node defined by the network configuration. Entries are indexed by destination node numbers as described above (e.g., node "5" would shift a "1" five bits in the address mask for that node). The minimum entry contains a count of the number of transmission relays, or "hops" necessary to reach a destination node and the node number (LINK) of the nearest neighbor forming the next link in the chain of hops to the destination node. The number of hops necessary to reach a destination is formed by induction from the process described below.

Route tables are updated in a two step process including (a) a node's transmission of its connectivity or route update message and (2) the processing of a received connectivity or route update message. The route update message is similar to the connectivity mask described above, except that it typically contains two (or more if required) bits per node position. The bits are taken from the corresponding bit position of the words which constitute a route update message. Regardless of the representation chosen for transmission, these bits are interpreted as follows:

1) 00: no known connectivity to the indicated node;

2) 01: the node is a nearest neighbor;

3) 10:1 relay is required to reach the node; and 4) 11:2 relays are required to reach the node.

If a network to be deployed requires more than two relays to ensure connectivity, the route update message would be expanded to three or four bits per node at the expense of longer, and probably less frequent, updates.

At periodic intervals, or more often if indicated by mobility data, each node will construct and transmit a status message formed by setting each node's relative position in the route update message to:

1) "01" if the node is a nearest neighbor;

2) "00" if the corresponding route table entry contains a zero;

3) One plus the hop count for the corresponding entry in the route table if that sum is less than the configured maximum (four, in this example); zero otherwise.

A node updates its route table in response to a route update message by invalidating (set the hop count to zero) all route table entries for which the source node was the specified LINK and extracting the hop count for each position represented in the route update message. If the transmitted hop count is less than the hop count in the route table entry for that node, the route table's hop count is replaced and the source node is specified as the new LINK.

3. Route Decision Process

The most basic route decision is to determine if the node has established connectivity to the destination node, or nodes in the case of a multi-cast message. Since all nodes maintain route table data within the tolerances specified by system configuration, the current node will lie on the shortest path (measured by hop counts) if the route request was specifically addressed to the current node. Therefore, if the route table entry for a destination node contains a non-zero hop count, the specified link node is the next LINK on the shortest path. However, if the route request was not specifically addressed to the current node, the request is interpreted as a broadcast and the current node will select a route if one is available or rebroadcast the message once. Typically, a route continuation selected in response to such a broadcast request is probably neither unique nor optimal. Selection from multiple paths is deferred to a higher protocol layer such as a route selection algorithm. Generally, this condition indicates a poor network configuration estimate of the relative range of transmitters to geographic dispersal and would be better handled by placing additional bits in the status update message.

Hardware Configuration for Each Node

Figure 2:
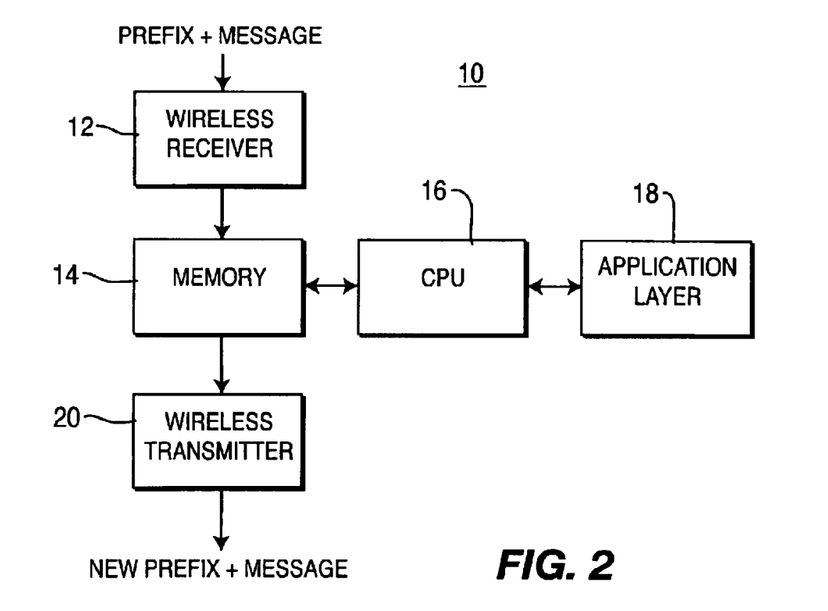
FIG. 2 is a block diagram of the hardware of each node in the small, ad hoc wireless network used in implementing the present invention.

FIG. 2 illustrates a block diagram of the hardware of each node 10 in the small, ad hoc wireless network used in implementing the techniques of the invention. As illustrated, each node includes a wireless receiver 12 which receives a message and its routing data from a neighboring node. As noted above, the message routing data contains, at a minimum, a destination word, a route word, and one or more words of route update information. The message and routing data received by node 10 is stored in memory 14 for processing and/or retransmission of the message data. Memory 14 may also include the node mask for node 10 as well as the route table for node 10. A CPU 16 processes the routing data as explained below with respect to FIG. 3 to determine if the current message is addressed to node 10 as the destination node and, if so, the message data is passed to the application layer 18 for further processing. On the other hand, if CPU 16 determines that it is a relay node for the current message, then the message data is read out of memory 14 and retransmitted by wireless transmitter 20. However, the retransmitted message includes, in addition to the message data, new routing data including the destination word, a new route word in place of the old route word, and one or more new words of update information, in place of the old update information, representing the network configuration as known to the retransmitting node.

Software Flow Chart for Message Processing by Each Node

Figure 3:
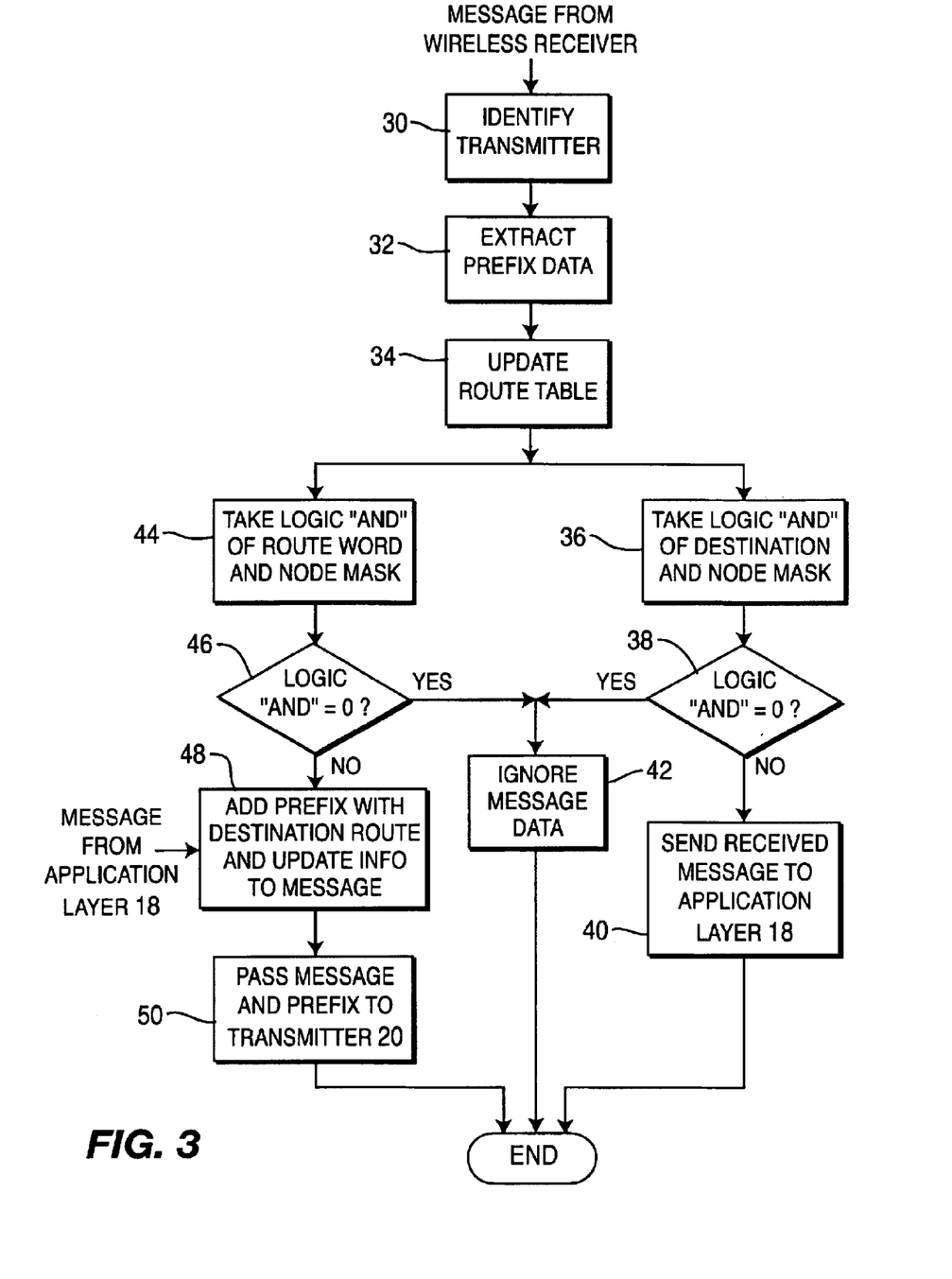
FIG. 3 is a flow diagram illustrating the flow of routing and message data from, to, and through a typical node in the small, ad hoc wireless network of the invention.

FIG. 3 is a flow diagram illustrating the flow of routing and message data from, to, and through a typical node 10. As illustrated, the transmitter of the received message is identified at step 30 (e.g., by time or frequency slot), and the routing data for the message is extracted from the message for processing at step 32. As will be explained in more detail below, the route table is then generated and updated from the route update message at step 34 by software operating on CPU 16. All nodes which receive the message update their route tables irrespective of whether or not the message was addressed to that node. The software then determines if the message was intended for the current node. In particular, at step 36, the software operating on CPU 16 takes a logical "AND" of the destination node specified in the received routing data and the node mask for the current node. If it is determined at step 38 that there is a match (i.e., the current node is a destination node), then the received message data is sent to the application layer 18 for processing at step 40. On the other hand, if it is determined at step 38 that there is no match (logical "AND"=0), then the received message data is not for the current node and is ignored at step 42. Similarly, and preferably concurrently, at step 44, the software operating on CPU 16 may also take a logical "AND" of the route word specified in the received routing data and the node mask for the current node. If it is determined at step 46 that there is a match (i.e., the current node is a relay node), then the received message data is given routing data at step 48 including the destination node, the route data from the current node, and the route update information from the route table of current node are passed to the transmitter 20 at step 50 for retransmission. However, if it is determined at step 46 that there is no match (logical "AND"=0), then the message data is not to be relayed by the current node and is ignored at step 42. When the current node is the source node, new messages from the application layer 18 may also be transmitted by adding appropriate routing data at step 48 and passing the message and routing data to the transmitter 20 at step 50.

In accordance with the invention, the route table generating and updating software utilized at step 34 performs the following tasks:

1) Maintains an up-to-date version of the node's route update message;

2) Constructs a route table from the route update messages received from other nodes;

3) Generates a route for each message originated by the node 10; and

4) Updates the route for each message retransmitted by the node 10.

Figure 4:
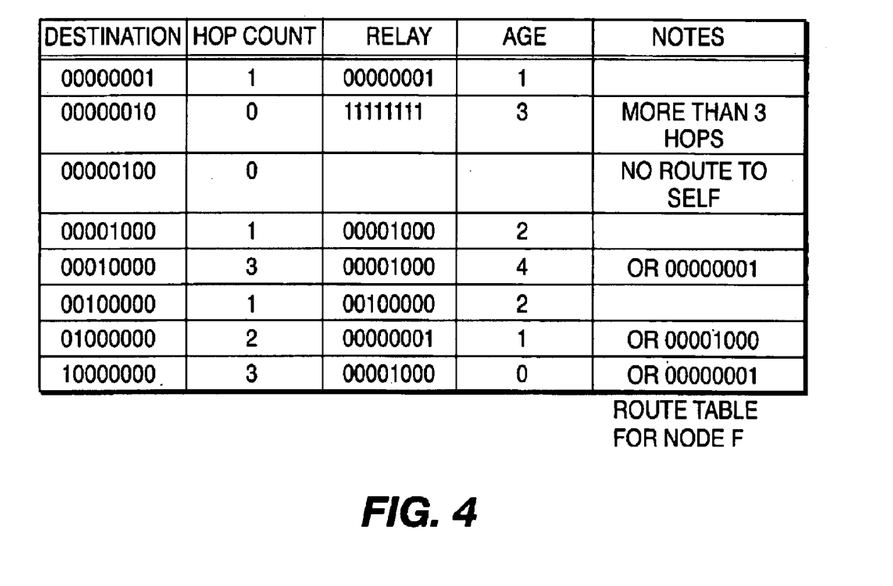
FIG. 4 illustrates a route table structure for node "F" of FIG. 1 based on a two word route message.

As shown in FIG. 4 for Node "F" of FIG. 1, the route table in node 10 contains one row for each possible node in the small wireless network, where each row contains:

1) The mask word associated with each other node (destination node);

2) The number of transmissions (or hops) required to reach the destination node from the current node;

3) The mask word of the first relay node along the path to the destination node; and 4) A timer indicating the relative age of the entries in this row.

The initial state of the route table indicates that all nodes are reached through relay '11111111', that is, every node receiving this message is instructed to attempt delivery to the destination(s). The presence of network traffic will cause the update process described below to modify this selection to produce the shortest, direct route to the selected destination node(s). As shown in FIG. 4, if the current node cannot determine the number of hops to the particular destination node, the route table maintains the initial state. On the other hand, the initial state of the route update message words is '00000000', that is, no nodes are known to be reachable.

When a valid message is received by the wireless receiver 12, the first-order route update word is corrected by inserting a "1" bit in the position corresponding to the transmitter of the message. When each node has transmitted one message and received those transmitted by the other nodes, the connectivity or route update words for each node of the network may be determined. For example, the connectivity words for the example network of FIG. 1 is as follows:

| Radio connectivity | ABCDEFGH |
|---|---|
| Node A, address 10000000 hears | 01000000 |
| Node B, address 01000000 hears | 10011001 |
| Node C, address 00100000 hears | 00000100 |
| Node D, address 00010000 hears | 01000010 |
| Node E, address 00001000 hears | 01000100 |
| Node F, address 00000100 hears | 00101001 |
| Node G, address 00000010 hears | 00010000 |
| Node H, address 00000001 hears | 01000100 |

The table above indicates that the nodes do not "hear" themselves. Such may, or may not, be the case for a given physical transmitter/receiver. However, the process will automatically exclude the node on which it is executing from any routing decisions. The topology of the network is not represented in the table, nor is it required by the algorithms embodied in this process. As a result, the network configuration is fluid and may change without compromising the network's communications.

When a message is received from the application layer 18 for transmission to another node(s), the destination address (es) are used to construct a destination word by taking the logical OR of the bit-address for each destination. The result will contain a "1" bit in each position corresponding to a desired recipient. For example, a message intended for nodes "B", "E", and "H" would produce a destination word of '01001001'. The technique of the invention is particularly desirable for such multi-cast capability since it does not increase the size of the message address nor does it require multiple transmissions. Such a capability is well suited to sub-group situation awareness and status messages.

On the other hand, the route for a message, whether received from the application layer 18 or from the retransmit process, is constructed from the logical OR of the relay mask word from each route table entry corresponding to a selected destination node or nodes. The result will contain a "1" bit in each position corresponding to a node which is expected to retransmit the message, thereby extending the range of the transmission. For the example message above, node "C" would construct a route word of '00000100' since currently node "F" is its only link to the rest of the network. In retransmitting the message, node "F" could choose either node "H" or node "E" as the relay to node "B", depending on the dynamics of the network at the time the message is received.

The number of words in the route update message is established when the network is first deployed and is selected by specifying the maximum number of relay transmissions acceptable for network applications. The route update message need not he transmitted with every message and may instead be transmitted at predetermined intervals. The route update message is interpreted as follows:

1) The words in the route update message are stacked vertically from first to last;
2) The column of bits corresponding to the desired destination node is selected;
3) The column of bits (slice) as a binary number yielding the number of transmits (hop count) necessary to reach the destination is evaluated; and
4) If the hop count is zero, a valid route in not known, and the node may choose to relay through all nodes to reach the destination node.

For example, the two word route message for node "F" is:

| Node F, address 00000100 connectivity | ABCDEFGH |
|---|---|
| | 10111001 |
| | 11010000 |

Reading downward, a message from Node F can get to node A in 3 hops (binary "11"), to Node B in 2 hops (binary "10"), to Node C in 1 hop (binary "01"), to node D in 3 hops ("11"), to Node E in 1 hop ("01"), and to node H in 1 hop ("01"). Since a message cannot get to Node G within 3 hops, Node G is identified as being unreachable ("00"). A longer route update message would be required to pass on information about node G.

FIG. 4 illustrates a route table structure for node "F" of FIG. 1 based on the two word route message above. There is no relay specified for the row corresponding to node "F" (mask=00000100). Also, it should be noted that there are two routes of equal length to node "B" and through it to nodes "A" and "D". The algorithm to select the designated route is determined at system generation time by desired performance characteristics. The choice can be based on signal-to-noise ratio of the received message, the number of bits requiring error correction, the most recent update, and the like. The actual routing of the messages is independent of the method of selection.

The route update message for node "F" is generated from the route table of FIG. 4 by performing the following steps for each row, k, in the route table: for each bit, $2^n$, in the hop count number, set bit k of word n of the route update message to 0 or 1 according whether bit n of the hop count is 0 or 1, respectively. As noted above with respect to FIG. 3, when a route update message arrives at a node, the source transmitter is identified and the message is decomposed into hop counts to each of the defined nodes in the network. A hop count of zero implies that the transmitter has no known path to that node. Each hop count is incremented by one to produce the hop count from the receiver to the destination node. Values equal to $2^n$ are discarded as too large to be represented in a route update message. Each row of the route table is then examined to determine if the candidate route is shorter than the current route. If so, the hop count and relay entries are replaced by the candidate route. On the other hand, if the current and candidate routes are the same length, other algorithms, as suggested above, can be used to determine which route is selected. Finally, the age of each entry in the table for which the transmitter is designated as the relay is set to zero.

Those skilled in the art will appreciate that the route update message does not indicate the path from node "F" to node "D" or any other node. Rather, the route update message indicates that the transmission to Node "D" requires three transmissions to complete. The Appendix below contains complete one, two, and three word route messages for the sample network of FIG. 1. Examination of the two word message table for Node "D" will indicate that the path from Node "D" to Node "F" also contains three hops; however, the two paths could be different (D-B-E-F or D-B-H-F).

The mobility of nodes, as well as environmental factors such as atmospheric conditions and terrain could cause the data in the route table of a particular node to be incorrect. To offset this possibility, the route table is examined periodically and "stale" entries are set to the initial value (i.e., no known route). Then, the route table is (partially) refreshed with each incoming message as follows:

1) Set the relay node to correspond to the transmitter;
2) Select the route table row corresponding to the relay node and set the hop count to 1 to indicate that the relay node is "directly" connected;
3) Set the relay mask word in the same row to specify the relay (destination and mask words will be identical);
4) Set the timer age in the same row to zero;
5) Stack the words of the route update message as described above and step through each column position, performing the following steps:
   a) Set the target node to correspond to the column position;
   b) Select the route table row corresponding to the target, and if all bits of the slice are "0" (relay has no path to target) OR all bits of the slice are "1" (maximum number of hops from relay to target), then if the selected row's relay mask corresponds to the relay, set the hop count to zero, set the relay mask to the initial state, and set the timer age to zero; otherwise, advance to the next column in the update message. On the other hand, if all bits of the slice are not "0" or "1", add one to the slice value. If it is less than the hop count in the target row, then replace the hop count by the incremented slice value, set the relay mask to the relay, and set the timer age to zero; and
   c) Advance to the next column in the update message.

This process is applied to all messages received by a node regardless of the subsequent disposition of the message.

At scheduled intervals, based on application considerations, the process on each node may examine each entry in the route table, increment the timer age and compare the incremented value to a system established limit. If an entry has aged beyond the established limit, that entry and all others for which the expired position's destination node is the designated relay will be set to the initial value.

Those skilled in the art will appreciate that the very short route update messages appended to normal messages produce a highly accurate route table without significant overhead. Depending on the application, reduced traffic volumes could either trigger periodic "keep alive" route messages or let the route table decay to its initial state to be dynamically reconstructed as traffic increases.

Those skilled in the art will further appreciate that the technique of the invention also has the advantage that it is more bandwidth efficient since the volume of information exchanged for routing is small. The technique of the invention also maximizes battery life in portable nodes since it reduces overhead communications, particularly since nothing needs to be transmitted until a message is ready to be sent. Moreover, more frequent updates for mobile users can be achieved with reduced overhead, thereby reducing any stale route problems.

The technique of the invention also provides for efficient multi-cast addressing since multiple destinations can be specified in a single word. In addition, the ad hoc wireless routing technique of the invention allows simplified communications with moving nodes so long as at least one other node in the network stays within range of the moving destination node.

It is to be understood that the apparatus and method of operation taught herein are merely illustrative of the invention. Of course, additional techniques and algorithms may be implemented in the system of the invention by those skilled in the art without departing from the spirit or scope of the invention. For example, a node may maintain additional data such as battery life, transmit power considerations, and the like, for its neighbors. This data could be recovered from periodic status update messages and could be incorporated into the route decision. The addition of these criteria imply a more sophisticated route selection than "fewest hops," but would require no additional data in the route update message. Accordingly, these and other such modifications are intended to be included in the scope of the invention as set forth in the appended claims.

APPENDIX
Route Messages for the Example Network of FIG. 1

1 word route messages:

Node A, address 10000000 connectivity   ABCDEFGH
                                        01000000
  can get to node B in 1 hop.
Node B, address 01000000 connectivity   ABCDEFGH
                                        10011001
  can get to nodes A, D, E, and H in 1 hop.
Node C, address 00100000 connectivity   ABCDEFGH
                                        00000100
  can get to node F in 1 hop.
Node D, address 00010000 connectivity   ABCDEFGH
                                        01000010
  can get to nodes B and G in 1 hop.
Node E, address 00001000 connectivity   ABCDEFGH
                                        01000100
  get to nodes B and F in 1 hop.
Node F, address 00000100 connectivity   ABCDEFGH
                                        00101001
  can get to nodes C, E, and H in 1 hop.
Node G, address 00000010 connectivity   ABCDEFGH
                                        00010000
  can get to node D in 1 hop.
Node H, address 00000001 connectivity   ABCDEFGH
                                        01000100

APPENDIX-continued
Route Messages for the Example Network of FIG. 1 can get to nodes B and F in 1 hop.

2 word route messages:

Node A, address 10000000 connectivity   ABCDEFGH
                                        01000110
                                        00011111
  can get to node B in 1 hop;
  can get to node D in 2 hops;
  can get to node E in 2 hops;
  can get to node F in 3 hops;
  can get to node G in 3 hops;
  can get to node H in 2 hops.
Node B, address 01000000 connectivity   ABCDEFGH
                                        10111001
                                        00100110
  can get to node A in 1 hop;
  can get to node C in 3 hops;
  can get to node D in 1 hop;
  can get to node E in 1 hop;
  can get to node F in 2 hops;
  can get to node G in 2 hops;
  can get to node H in 1 hop.
Node C, address 00100000 connectivity   ABCDEFGH
                                        01000100
                                        01001001
  can get to node B in 3 hops;
  can get to node E in 2 hops;
  can get to node F in 1 hop;
  can get to node H in 2 hops.
Node D, address 00010000 connectivity   ABCDEFGH
                                        01000110
                                        10001101
  can get to node A in 2 hops;
  can get to node B in 1 hop;
  can get to node E in 2 hops;
  can get to node F in 3 hops;
  can get to node G in 1 hop;
  can get to node H in 2 hops.
Node E, address 00001000 connectivity   ABCDEFGH
                                        01000110
                                        10110011
  can get to node A in 2 hops;
  can get to node B in 1 hop;
  can get to node C in 2 hops;
  can get to node D in 2 hops;
  can get to node F in 1 hop;
  can get to node G in 3 hops;
  can get to node H in 2 hops.
Node F, address 00000100 connectivity   ABCDEFGH
                                        10111001
                                        11010000
  can get to node A in 3 hops;
  can get to node B in 2 hops;
  can get to node C in 1 hop;
  can get to node D in 3 hops;
  can get to node E in 1 hop;
  can get to node H in 1 hop.
Node G, address 00000010 connectivity   ABCDEFGH
                                        10011001
                                        11001001
  can get to node A in 3 hops;
  can get to node B in 2 hop;
  can get to node D in 1 hop;
  can get to node E in 3 hops;
  can get to node H in 3 hops.
Node H, address 00000001 connectivity   ABCDEFGH
                                        01000110
                                        10111010
  can get to node A in 2 hops;
  can get to node B in 1 hop;
  can get to node C in 2 hops;
  can get to node D in 2 hops;
  can get to node E in 2 hops;
  can get to node F in 1 hop;
  can get to node G in 3 hops.

3 word route messages:

APPENDIX-continued

Route Messages for the Example Network of FIG. 1

Node A, address 10000000 connectivity     ABCDEFGH  
01000110  
00011111  
00100000 can get to node B in 1 hop;  
   can get to node C in 4 hops;  
   can get to node D in 2 hops;  
   can get to node E in 2 hops;  
   can get to node F in 3 hops;  
   can get to node G in 3 hops;  
   can get to node H in 2 hops.

Node B, address 01000000 connectivity     ABCDEFGH  
10111001  
00100110  
00000000 can get to node A in 1 hop;  
   can get to node C in 3 hops;  
   can get to node D in 1 hop;  
   can get to node E in 1 hop;  
   can get to node F in 2 hops;  
   can get to node G in 2 hops;  
   can get to node H in 1 hop.

Node C, address 00100000 connectivity     ABCDEFGH  
01000110  
01001001  
10010010 can get to node A in 4 hops;  
   can get to node B in 3 hops;  
   can get to node D in 4 hops;  
   can get to node E in 2 hops;  
   can get to node F in 1 hop;  
   can get to node G in 5 hops;  
   can get to node H in 2 hops.

Node D, address 00010000 connectivity     ABCDEFGH  
01000110  
10001101  
00100000 can get to node A in 2 hops;  
   can get to node B in 1 hop;  
   can get to node C in 4 hops;  
   can get to node E in 2 hops;  
   can get to node F in 3 hops;  
   can get to node G in 1 hop;  
   can get to node H in 2 hops.

Node E, address 00001000 connectivity     ABCDEFGH  
01000110  
10110011  
00000000 can get to node A in 2 hops;  
   can get to node B in 1 hop;  
   can get to node C in 2 hops;  
   can get to node D in 2 hops;  
   can get to node F in 1 hop;  
   can get to node G in 3 hops;  
   can get to node H in 2 hops.

Node F, address 00000100 connectivity     ABCDEFGH  
10111001  
11010000  
00000010 can get to node A in 3 hops;  
   can get to node B in 2 hops;  
   can get to node C in 1 hop;  
   can get to node D in 3 hops;  
   can get to node E in 1 hop;  
   can get to node G in 4 hops;  
   can get to node H in 1 hop.

Node G, address 00000010 connectivity     ABCDEFGH  
10111001  
11001001  
00100100 can get to node A in 3 hops;  
   can get to node B in 2 hops;  
   can get to node C in 5 hops;  
   can get to node D in 1 hop;  
   can get to node E in 3 hops;  
   can get to node F in 4 hops;

APPENDIX-continued

Route Messages for the Example Network of FIG. 1 can get to node H in 3 hops.

Node H, address 00000001 connectivity     ABCDEFGH  
01000110  
10111010  
00000000 can get to node A in 2 hops;  
   can get to node B in 1 hop;  
   can get to node C in 2 hops;  
   can get to node D in 2 hops;  
   can get to node E in 2 hops;  
   can get to node F in 1 hop;  
   can get to node G in 3 hops.

We claim:

1. A method for transmitting message data within a wireless network from a source node to at least one destination node, comprising:

updating a configuration of the wireless network by stacking each N bit word in a route update message vertically from first to last; selecting a column of bits corresponding to the destination node, and determining a hop count associated with the destination node as the binary number defined by the column of bits corresponding to the destination node;

determining a destination identifier based on the at least one destination node;

determining a route identifier based on the at least one destination node and the configuration of the wireless network known at the source node, the route identifier indicating at least one neighboring node within the wireless network;

determining a route update message including at least one connectivity mask based on the configuration of the wireless network known at the source node; and transmitting the message data appended with the destination identifier, the route identifier and the route update message.

2. The method of claim 1, wherein:

the destination identifier is an N bit word indicating the at least one destination node, N being a number of nodes within the wireless network, the route identifier is an N bit word indicating at least one node neighboring the source node, and the route update message is at least one N bit word indicating a configuration of the wireless network known by the source node.

3. The method of claim 1, wherein:

each destination node has an associated mask, the destination identifier is a logical OR of the masks associated with each destination node.

4. A method for receiving message data at a node within a wireless network, comprising:

extracting a destination identifier from received message data, the received message data being appended with the destination identifier, a route indicator and a route update message;

comparing the extracted destination identifier with a node address; and processing the received message data when the extracted destination identifier matches the compared node address;

wherein, when the route update message has more than one N bit word, updating a route table by at least:

stacking each N bit word in the route update message vertically from first to last; selecting a column of bits corresponding to the destination node; and determining the hop count associated with the destination node as the binary number defined by the column of bits corresponding to the destination node.

5. The method of claim 4, wherein:

the destination identifier is an N bit word indicating the at least one destination node, N being a number of nodes within the wireless network, and the node address being an N bit work associated with the node.

6. The method of claim 5, wherein:

said comparing step includes performing a logical AND of the extracted destination identifier and the node address, and the extracted destination identifier matches the node address when the logical AND is true.

7. The method of claim 4, wherein:

said processing step includes sending the message data to an application program.

8. A node within a wireless network, comprising:

a processor, a memory coupled to said processor, said memory having stored therein a route table having a plurality of hop counts and a plurality of relay indicators associated with a plurality of nodes within the wireless network, said memory having stored therein a plurality of instructions that, when executed by a processor, cause the processor to:

determine a destination identifier based on at least one destination node;

determine a route identifier based on the at least one destination node and a configuration of the wireless network known at a source node, the route identifier indicating at least one neighboring node within the wireless network;

determine a route update message including at least one connectivity mask based on the configuration of the wireless network known at the source node;

transmit the message data appended with the destination identifier, the route identifier and the route update message; and when the route update message has more than one N bit word: stack each N bit word in the route update message vertically from first to last; select a column of bits corresponding to the destination node; and determine the hop count associated with the destination node as the binary number defined by the column of bits corresponding to the destination node.

9. The node of claim 8, wherein:

the destination identifier is an N bit word indicating the at least one destination node, N being a number of nodes within the wireless network, the route identifier is an N bit word indicating at least one node neighboring the source node, and the route update message is at least one N bit word indicating a configuration of the wireless network known by the source node.

10. The method of claim 9, wherein:

each destination node has an associated mask, the destination identifier is a logical OR of the masks associated with each destination node.

11. A node within a wireless network, comprising:

a processor, a memory coupled to said processor, said memory having stored therein a route table having a plurality of hop counts and a plurality of relay indicators associated with a plurality of nodes within the wireless network, said memory having stored therein a plurality of instructions that, when executed by a processor, cause the processor to:

extract a destination identifier from received message data, the received message data being appended with a destination identifier, a route indicator and a route update message;

compare the extracted destination identifier with a node address;

process the received message data when the extracted destination identifier matches the compared node address; and, when the route update message has more than one N bit word: stack each N bit word in the route update message vertically from first to last; select a column of bits corresponding to the destination one of said nodes; and determine a hop count associated with the destination one of said nodes as the binary number defined by the column of bits corresponding to the destination on of said nodes.

12. The node of claim 11, wherein:

the destination identifier is an N bit word indicating the at least one destination node, N being a number of nodes within the wireless network, and the node address being an N bit work associated with the node.

13. The node of claim 12, wherein the compare instruction further includes an instruction, when executed by the processor, causes the processor to:

perform a logical AND of the extracted destination identifier and the node address, the extracted destination identifier matches the node address when the logical AND is true.

14. The node of claim 11, wherein the process instruction further includes an instruction, when executed by the processor, causes the processor to:

send the message data to an application program.

15. A wireless network having a plurality of nodes, each node comprising:

a route table having a plurality of hop counts and a plurality of relay indicators associated with the plurality of nodes;

a receiver coupled to said route table, said receiver receiving message data appended with a route identifier and a route update message;

a transmitter coupled to said receiver and to said route table, said transmitter sending message data with the route identifier and the route update message being updated based on the route table; and, code for stacking each N bit word in the route update message vertically from first to last, selecting a column of bits corresponding to the destination node, and determining the hop count associated with the destination node as the binary number defined by the column of bits corresponding to the destination node when the route update message has more than one N bit word.

16. A method for relaying, at a node within a wireless network, received message data appended with a route identifier and a route update message, said method comprising:

updating a route table based on the route update message appended to received message data, the route table including a plurality of hop counts and a plurality of relay indicators associated with a plurality of nodes within the wireless network, wherein when the route update message has more than one N bit word, said updating comprises: stacking each N bit word in the route update message vertically from first to last; selecting a column of bits corresponding to the destination node; and determining the hop count associated with the destination node as the binary number defined by the column of bits corresponding to the destination node;

selecting said at least one neighboring node within the wireless network based on at least one hop count and at least one relay indicator of the route table, wherein the route identifier is an N bit word indicating the at least one selected neighboring node, N is a number of nodes within the wireless network, and the route update message is at least one N bit work indicating configuration information about the wireless network known by a transmitting node from which the route update message was received;

replacing the route identifier and the route update message appended to the received message data based on at least one hop count and at least one relay indicator of the updated route table; and transmitting the message data appended with the replaced route identifier and the replaced route update message to the selected at least one neighboring node.

17. The method of claim 16, further comprising:
performing a logical AND of the route identifier and a node address associated with the node, the node address being an N bit word;
performing said updating step, said selecting step, said replacing step and said transmitting step before and when the logical AND is true.

18. The method of claim 16, further comprising:
determining the transmitting node from which the message data was received;
setting the hop count associated with the transmitting node to one; and
updating the relay indicator associated with the transmitting node with a value identifying the transmitting node.

19. The method of claim 18, wherein the value identifying the transmitting node is an N bit word indicating the transmitting mode.

20. The method of claim 16, further comprising:
performing, when a timer exceeds a predetermined time out for a row of the route table, the following:
setting the hop count associated with the transmitting node to an initial value; and
updating the relay indicator associated with an initial state.

21. A method for relaying, at a node within a wireless network, received message data appended with a route identifier and a route update message, said method comprising:
updating a route table based on the route update message appended to received message data, wherein the route table has a plurality of hop counts and a plurality of relay indicators associated with a plurality of nodes within the wireless network;
selecting at least one neighboring node within the wireless network based on at least one hop count and at least one relay indicator of the route table;

replacing the route identifier and the route update message appended to the received message data based on at least one hop count and at least one relay indicator of the updated route table; and transmitting the message data appended with the replaced route identifier and the replaced route update message to the selected at least one neighboring node;

wherein, said updating comprises the following when the route update message has more than one N bit word:
stacking each N bit word in the route update message vertically from first to last;
selecting a column of bits corresponding to a target node;
selecting a row of the route table corresponding to the target node;
setting, for the selected row, the hop count to zero and the route indicator to an initial state if: the relay indicator consists of all one's or zero's, and the relay indicator associated with the selected row corresponds to the node; and,
setting, for the selected row, the hop count to the value of one plus the column of bits corresponding to the target node if: the hop count is less than one plus the column of bits corresponding to the target node, and the relay indicator includes a one and a zero.

22. A method for updating a route table associated with a node within a wireless network, the route table having a plurality of hop counts and a plurality of relay indicators associated with a plurality of nodes in the wireless network, comprising:
extracting a route update message from received message data, the received message data being appended with a route update message; and
updating the hop count and the relay indicator stored in the route table based on the extracted route update message;
wherein, when the route update message has more than one N bit word, said updating comprises: stacking each N bit word in the route update message vertically from first to last; selecting a column of bits corresponding to the destination node; and determining the hop count associated with the destination node as the binary number defined by the column of bits corresponding to the destination node.

23. The method of claim 22, wherein:
the route update message is at least one N bit word indicating configuration information about the wireless network known by a transmitting node from which the route update message was received.

24. The method of claim 22, further comprising:
determining the transmitting node from which the message data was received;
setting the hop count associated with the transmitting node to one; and
updating the relay indicator associated with a value identifying the transmitting node.

25. The method of claim 24, wherein the value identifying the transmitting node is an N bit word indicating the transmitting mode, N being a number of nodes within the wireless network.

26. A method for updating a route table associated with a node within a wireless network, the route table having a plurality of hop counts and a plurality of relay indicators associated with a plurality of nodes in the wireless network, comprising:
extracting a route update message from received message data, the received message data being appended with a route update message; and updating at least one of said hop counts and the relay indicators based on the extracted route update message;

wherein, when the route update message has more than one N bit word, said updating comprises: stacking each N bit word in the route update message vertically from first to last; selecting a column of bits corresponding to the destination node; and determining the hop count associated with the destination node as the binary number defined by the column of bits corresponding to the destination node.

27. The method of claim 26, further comprising:

performing, when a timer exceeds a predetermined time out for an entry of the route table, the following:
setting the hop count associated with the transmitting node to an initial value; and
updating the relay indicator associated with an initial state.

28. A method for updating a route table associated with a node within a wireless network, the route table having a plurality of hop counts and a plurality of relay indicators associated with a plurality of nodes in the wireless network, comprising:

extracting a route update message from received message data, the received message data being appended with a route update message; and updating at least one of said hop counts and relay indicators stored in the route table based on the extracted route update message; wherein when the route update message has more than one N bit word, said updating comprises:
stacking each N bit word in the route update message vertically from first to last;
selecting a column of bits corresponding to a target node;
selecting a row of the route table corresponding to the target node;
setting, for the selected row, the hop count to zero and the route indicator to an initial state if: the relay indicator consists of all one's or zero's, and the relay indicator associated with the selected row corresponds to the node; and,
setting, for the selected row, the hop count to the value of one plus the column of bits corresponding to the target node if: the hop count is less than one plus the column of bits corresponding to the target node, and the relay indicator includes a one and a zero.

29. A node within a wireless network, comprising:

a processor, a memory coupled to said processor, said memory having stored therein a route table having a plurality of hop counts and a plurality of relay indicators associated with a plurality of nodes within the wireless network, and a plurality of instructions that, when executed by a processor, cause the processor to:

update the route table based on a route update message appended to received message data, wherein the route update message includes at least one N bit word indicating configuration information about the wireless network known by a transmitting node from which the route update message was received, wherein when the route update message has more than one N bit word, said updating comprises: stacking each N bit word in the route update message vertically from first to last; selecting a column of bits corresponding to the destination node; and determining the hop count associated with the destination node as the binary number defined by the column of bits corresponding to the destination node;

select at least one neighboring node within the wireless network based on at least one hop count and at least one relay indicator of the route table;

replace a route identifier appended to the received message data and the route update message appended to the received message data based on at least one hop count and at least one relay indicator of the updated route table, wherein the route identifier includes an N bit word indicating the at least one selected neighboring node, N being a number of nodes within the wireless network.

30. The node of claim 29, wherein:

the route table has a plurality of hop counts and a plurality of relay indicators asssociated with the plurality of nodes within the wireless network;

the at least one neighboring node within the wireless network is selected based on at least one hop count and at least one relay indicator of the route table; and the route identifier and the route update message appended to the received message data is replaced based on at least one hop count and at least one relay indicator of the updated route table.

31. The node of claim 29, wherein:

the route identifier is an N bit word indicating the at least one selected neighboring node, N being a number of nodes within the wireless network;

the route update message is at least one N bit word indicating configuration information about the wireless network known by a transmitting node from which the route update message was received.

32. The node of claim 29, wherein said memory has stored thereon further instructions that, when executed by a processor, cause the processor to:

perform a logical AND of the route identifier and a node address associated with the node, the node address being an N bit word;

perform said update, said select and said replace before and when the logical AND is true.

33. The node of claim 29, wherein said memory has stored thereon further instructions that, when executed by a processor, cause the processor to:

determine the transmitting node from which the message data was received;

set the hop count associated with the transmitting node to one; and update the relay indicator associated with the transmitting node with a value identifying the transmitting node.

34. The node of claim 33, wherein the value identifying the transmitting node is an N bit word indicating the transmitting mode.

35. The node of claim 29, wherein said memory has stored thereon further instructions that, when executed by a processor, cause the processor to:

perform, when a timer exceeds a predetermined time out for a row of the route table, the following:
set the hop count associated with the transmitting node to an initial value; and
update the relay indicator associated with an initial state.

36. A node within a wireless network, comprising:

a processor, a memory coupled to said processor, said memory having stored therein a route table having associated with a plurality of nodes within the wireless network, said memory having stored therein a plurality of instructions that, when executed by a processor, cause the processor to:

update the route table based on a route update message appended to received message data, wherein when the route update message has more than one N bit word, said updating comprises: stacking each N bit word in the route update message vertically from first to last; selecting a column of bits corresponding a target node; selecting a row of the route table corresponding to the target node; setting, for the selected row, the hop count to zero and the route indicator to an initial state if: the relay indicator consists of all one's and zero's, and the relay indicator associated with the selected row corresponds to the node; and, setting, for the selected row, the hop count to the value of one plus the column of bits corresponding to the target node if: the hop count is less than one plus the column of bits corresponding to the target node, and the relay indicator includes a one and a zero;

select at least one neighboring node within the wireless network based on the route table; and, replace a route identifier appended to the received message data and the route update message appended to the received message data based on the updated route table;

wherein, the route table has a plurality of hop counts and a plurality of relay indicators associated with the plurality of nodes within the wireless network;

the at least one neighboring node within the wireless network is selected based on at least one hop count and at least one relay indicator of the route table; and, the route identifier and the route update message appended to the received message data is replaced based on at least one hop count and at least one relay indicator of the updated route table.

37. A node within a wireless network, comprising:

a processor, a memory coupled to said processor, said memory having stored therein a route table having a plurality of hop counts and a plurality of relay indicators associated with a plurality of nodes within the wireless network, said memory having stored therein a plurality of instructions that, when executed by a processor, cause the processor to:

extract a route update message appended to received message data; and, update the hop count and the relay indicator stored in the route table based on the extracted route update message;

wherein, when the route update message has more than one N bit word, said updating comprises: stacking each N bit word in the route update message vertically from first to last; selecting a column of bits corresponding to the destination node; and determining the hop count associated with the destination node as the binary number defined by the column of bits corresponding to the destination node.

38. The node of claim 37, wherein:

the route update message is at least one N bit word indicating configuration information about the wireless network known by a transmitting node from which the route update message was received.

39. The node of claim 37 wherein said memory has stored therein further instructions that, when executed by a processor, cause the processor to:

determine the transmitting node from which the message data was received;

set the hop count associated with the transmitting node to one; and update the relay indicator associated wit the transmitting node with a value identifying the transmitting node.

40. The node of claim 39, wherein the value identifying the transmitting node is an N bit word indicating the transmitting mode, N being a number of nodes within the wireless network.

41. The node of claim 37, wherein said memory has stored thereon further instructions that, when executed by a processor, cause the processor to:

perform, when a timer exceeds a predetermined time out for a row of the route table, the following:
set the hop count associated with the transmitting node to an initial value; and
update the relay indicator associated with an initial state.

42. A node within a wireless network, comprising:

a processor, a memory coupled to said processor, said memory having stored therein a route table having a plurality of hop counts and a plurality of relay indicators associated with a plurality of nodes within the wireless network, said memory having stored therein a plurality of instructions that, when executed by a processor, cause the processor to:

extract a route update message appended to received message data; and, update the hop count and the relay indicator stored in the route table based on the extracted route update message;

wherein, when the route update message has more than on N bit word, said updating comprises: stacking each N bit word in the route update message vertically from first to last; selecting a column of bits corresponding a target node; selecting a row of the route table corresponding to the target node; setting, for the selected row, the hop count to zero and the route indicator to an initial state if: the relay indicator consists of all one's or zero's, and the relay indicator associated with the selected row corresponds to the node; and, setting, for the selected row, the hop count to the value of one plus the column of bits corresponding to the target node if: the hop count is less than one plus the column of bits corresponding to the target node, and the relay indicator includes a one and a zero.

* * * * *

UNITED STATES PATENT AND TRADEMARK OFFICE
CERTIFICATE OF CORRECTION

PATENT NO. : 6,704,283 B1
DATED : March 9, 2004
INVENTOR(S) : Stiller et al.

It is certified that error appears in the above-identified patent and that said Letters Patent is hereby corrected as shown below:

Column 9,
Line 21, "update message need not he transmitted with" should read as -- update message need not be transmitted with --.
Line 31, "a valid route in not known," should read as -- a valid route is not known --.

Column 11,
Line 22, "multiple destinations can he" should read as -- multiple destinations can be --.

Column 22,
Line 46, "route update message has more than on" should read as -- route update message has more then one --.

Signed and Sealed this

Third Day of August, 2004

JON W. DUDAS
*Acting Director of the United States Patent and Trademark Office*